(12) United States Patent
Uenishi

(10) Patent No.: US 10,661,361 B2
(45) Date of Patent: May 26, 2020

(54) MILLING/CUTTING TOOL AND PROCESSING APPARATUS

(71) Applicant: Fanuc Corporation, Yamanashi (JP)

(72) Inventor: Daisuke Uenishi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/923,409

(22) Filed: Mar. 16, 2018

(65) Prior Publication Data

US 2018/0290220 A1    Oct. 11, 2018

(30) Foreign Application Priority Data

Apr. 10, 2017  (JP) .................................. 2017-077775

(51) Int. Cl.
  *B23C 5/20*        (2006.01)
  *B23B 27/16*       (2006.01)
  (Continued)

(52) U.S. Cl.
  CPC ............ *B23C 5/2243* (2013.01); *B23B 29/24* (2013.01); *B23C 5/22* (2013.01);
  (Continued)

(58) Field of Classification Search
  CPC ........ B23C 2200/045; B23C 2200/367; B23C 2200/0433; B23C 2200/361; B23C 2200/41; B23C 2200/086; B23C 2200/164; B23C 2200/205; B23C 2200/208; B23C 2210/168; B23C 2210/16; B23C 2210/165; B23C 2210/086; B23C 5/06; B23C 5/22; B23C 5/22211; B23C 5/04; B23C 5/2213; B23B 2200/0461; B23B 2200/369; B23B 2205/04; B23B 27/12; Y10T 407/192; Y10T 407/1924; Y10T 407/1952; Y10T 407/1908; Y10T 407/191; Y10T 407/1932; Y10T 407/1934; Y10T 407/1936; Y10T 407/1942; Y10T 407/227; Y10T 407/23;
  (Continued)

(56) References Cited

U.S. PATENT DOCUMENTS 1,838,520 A * 12/1931 Archer ................ B23B 27/1614
                                                   407/104
3,464,098 A    9/1969 Moore et al.
(Continued)

FOREIGN PATENT DOCUMENTS

CN       1564723 A      1/2005
CN     103862092 A      6/2014
(Continued)

OTHER PUBLICATIONS

Machine translation of JP-09155622-A, pp. 4-6 (Year: 2019).*
(Continued)

*Primary Examiner* — Nicole N Ramos
(74) *Attorney, Agent, or Firm* — Winstead PC

(57) ABSTRACT

Provided is a milling/cutting tool including: a tool main unit that is rotated about an axis; and a plurality of tips that are disposed at one end surface of the tool main unit with spacings therebetween in a circumferential direction about the axis of the tool main unit, wherein the individual tips are disposed so that turning rake surfaces thereof are inclined in the axial directions.

5 Claims, 7 Drawing Sheets

(51) Int. Cl.
*B23C 5/22* (2006.01)
*B23B 29/24* (2006.01)

(52) U.S. Cl.
CPC .... *B23C 2200/045* (2013.01); *B23C 2200/20* (2013.01); *B23C 2200/367* (2013.01); *B23C 2210/205* (2013.01); *B23C 2210/285* (2013.01)

(58) Field of Classification Search
CPC ........... Y10T 408/5586; Y10T 408/909; Y10T 408/90993
See application file for complete search history.

(56) References Cited

U.S. PATENT DOCUMENTS

| | | | | |
|---|---|---|---|---|
| 3,670,380 | A | * | 6/1972 | Moore ................. B23B 27/164 407/40 |
| 3,762,005 | A | * | 10/1973 | Erkfritz ................ B23C 5/2213 407/113 |
| 4,586,855 | A | * | 5/1986 | Rawle ..................... B23C 5/06 407/38 |
| 4,743,144 | A | | 5/1988 | Shikata |
| 4,789,273 | A | * | 12/1988 | Wiacek ................ B23C 5/2213 407/34 |
| 6,231,274 | B1 | * | 5/2001 | Yoneyama ............. B23C 5/006 407/113 |
| 6,270,292 | B1 | * | 8/2001 | Satran .................. B23C 5/2204 407/42 |
| 8,550,753 | B2 | * | 10/2013 | Sjoo .......................... B23C 5/06 407/34 |
| 2003/0167613 | A1 | | 9/2003 | Rydberg |
| 2004/0131433 | A1 | | 7/2004 | Edler |
| 2004/0177491 | A1 | | 9/2004 | Pinger et al. |
| 2005/0023044 | A1 | * | 2/2005 | Schuffenhauer ........ B23C 5/207 175/426 |
| 2006/0075858 | A1 | | 4/2006 | Edler |
| 2006/0162511 | A1 | | 7/2006 | Sjoo et al. |
| 2014/0161544 | A1 | * | 6/2014 | Morandeau, Sr. ........ B23C 3/13 407/40 |
| 2018/0290220 | A1 | | 10/2018 | Uenishi |

FOREIGN PATENT DOCUMENTS

| | | | | |
|---|---|---|---|---|
| CN | 208116861 | U | | 11/2018 |
| EA | 1415742 | A1 | | 5/2004 |
| EP | 0222156 | A1 | * | 5/1987 ............. B23C 5/207 |
| EP | 1666181 | A1 | | 6/2006 |
| JP | S62-088508 | A | | 4/1987 |
| JP | H07-251340 | A | | 10/1995 |
| JP | 09155622 | A | * | 6/1997 |
| JP | 2004-148498 | A | | 5/2004 |
| JP | 2005-525942 | A | | 9/2005 |
| JP | 2006-159403 | A | | 6/2006 |
| JP | 2006-517153 | A | | 7/2006 |
| JP | 2009-066677 | A | | 4/2009 |
| JP | 2010094748 | A | * | 4/2010 ............... B23C 5/06 |
| JP | 2011-031393 | A | | 2/2011 |
| WO | WO-2003070405 | A1 | | 8/2003 |
| WO | WO-2004069455 | A1 | | 8/2004 |

OTHER PUBLICATIONS

The State Intellectual Property Office of the People'S Republic of China; First Office Action for Chinese Application No. 201810302636.X; dated Jul. 16, 2019; 8 pages.

* cited by examiner

MILLING/CUTTING TOOL AND PROCESSING APPARATUS

CROSS-REFERENCE TO RELATED APPLICATIONS

This application is based on Japanese Patent Application No. 2017-77775, the contents of which are incorporated herein by reference.

TECHNICAL FIELD

The present invention relates to a milling/cutting tool and a processing apparatus.

BACKGROUND ART

In the related art, there is a known single cutting tool with which it is possible to perform turning and milling at a machining center (for example, see Patent Literature 1).

In this cutting tool, milling blades and turning bits are disposed in an alternating manner with spacings therebetween in the circumferential direction of a tool main unit that is rotated about an axis.

CITATION LIST

Patent Literature

{PTL 1} Japanese Unexamined Patent Application, Publication No. Hei 7-251340

SUMMARY OF INVENTION

The present invention provides the following solutions.

An aspect of the present invention provides a milling/cutting tool including: a tool main unit that is rotated about an axis; and a plurality of tips that are disposed with spacings therebetween in a circumferential direction of the tool main unit about the axis, wherein the individual tips are disposed so that turning rake surfaces thereof face the axial direction.

Another aspect of the present invention provides a processing apparatus that is provided with any one of the above-described milling/cutting tools.

DESCRIPTION OF EMBODIMENT

A milling/cutting tool 1 and a processing apparatus 10 according to an embodiment of the present invention will be described below with reference to the drawings.

Figure 1:
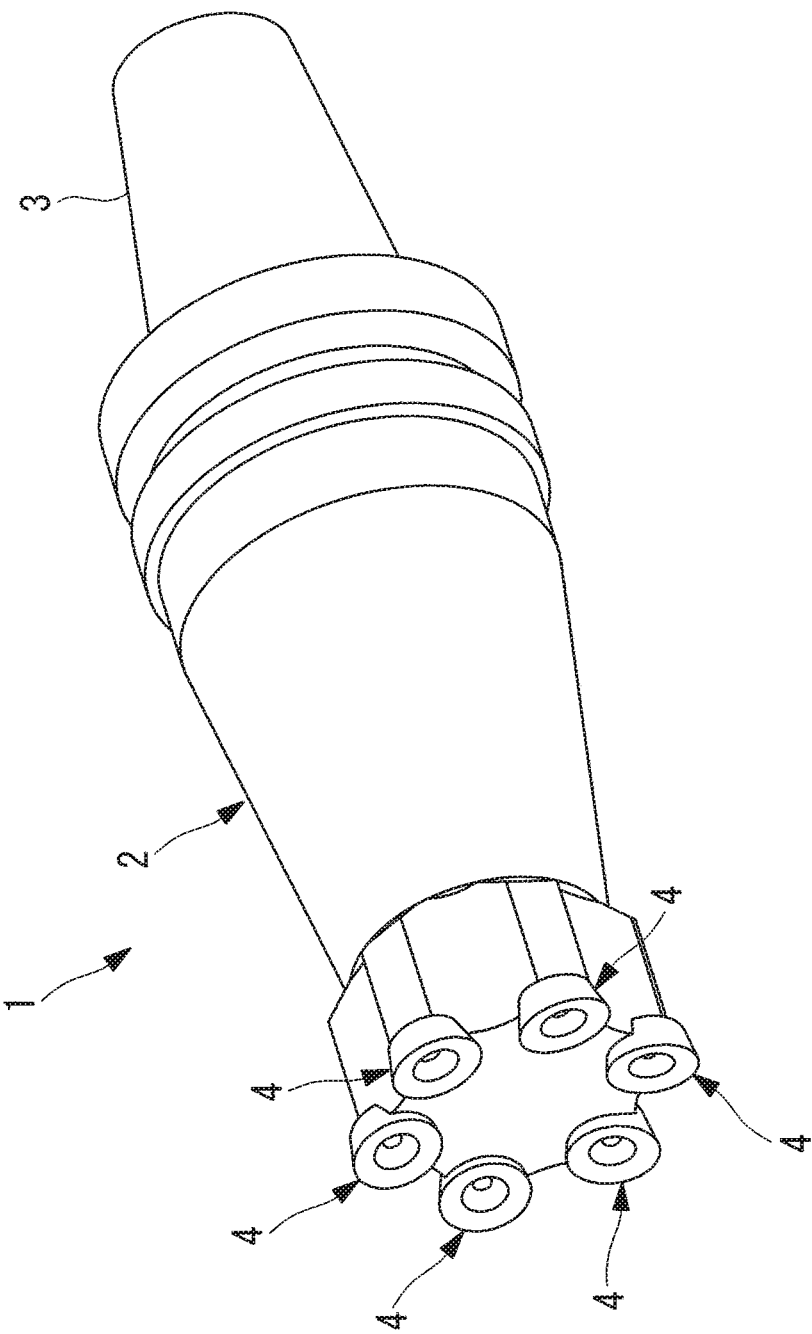
FIG. 1 is a perspective view showing a milling/cutting tool according to an embodiment of the present invention.
Figure 2:
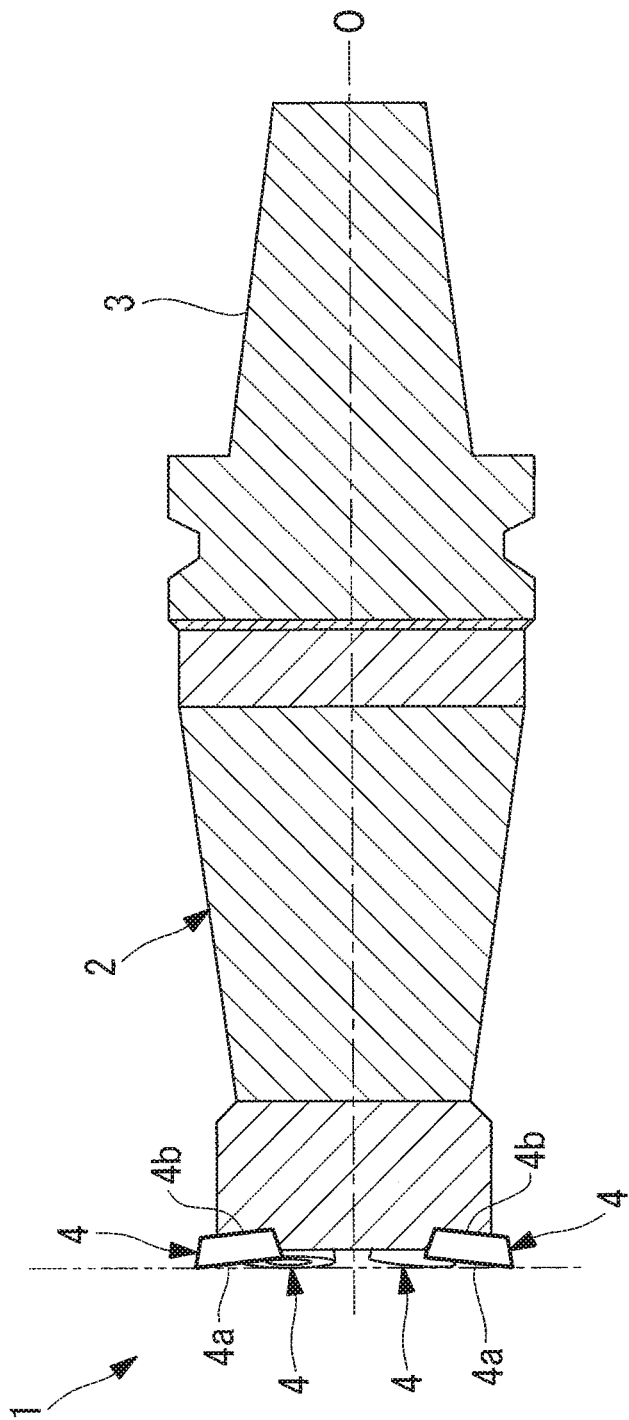
FIG. 2 is a longitudinal cross-sectional view showing the milling/cutting tool in FIG. 1.
Figure 3:
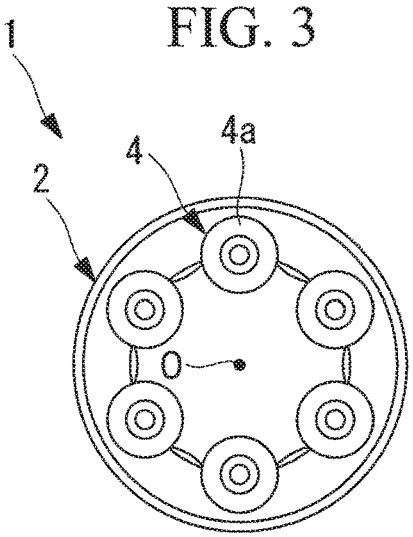
FIG. 3 is a front view showing the milling/cutting tool in FIG. 1.

As shown in FIGS. 1 to 3, the milling/cutting tool 1 according to this embodiment is provided with: a substantially columnar tool main unit 2 that is provided, at one end thereof, with a taper shank 3 for attaching the milling/cutting tool 1 to the processing apparatus 10; and a plurality of (for example, six) circular tips (tips) 4 that are attached to the other end of the tool main unit 2.

As shown in FIG. 2, the circular tips 4 have truncated-conical shapes having large-diameter surfaces 4a and small-diameter surfaces 4b. As shown in FIG. 3, the circular tips 4 are disposed at a distal-end surface of the tool main unit 2 at the same radial-direction positions at equal intervals in the circumferential direction about a center axis (axis) O. Also, the circular tips 4 are disposed so that portions of outer circumferential surfaces thereof protrude radially farther outward than the outer circumferential surface of the tool main unit 2 does.

In addition, as shown in FIG. 2, the circular tips 4 are disposed, on the distal-end side of the tool main unit 2, so that center axes thereof are slightly inclined, toward the distal end, in directions that approach the center axis O of the tool main unit 2. By doing so, the circular tips 4 are disposed so that the large-diameter surfaces 4a face the distal-end side (axial direction) along the center axis O of the tool main unit 2 and so as to be slightly inclined inward. In FIG. 2, the two-dot chain line indicates positions of the large-diameter surfaces 4a in the axial direction on the most distal-end side.

In other words, the large-diameter surfaces 4a of the circular tips 4 disposed at the distal end of the tool main unit 2 and that are disposed facing forward in the center axis O direction constitute rake surfaces when performing turning, and the outer circumferential surfaces of the circular tips 4 constitute rake surfaces when performing milling.

Next, the processing apparatus 10 according to this embodiment will be described.

Figure 4:
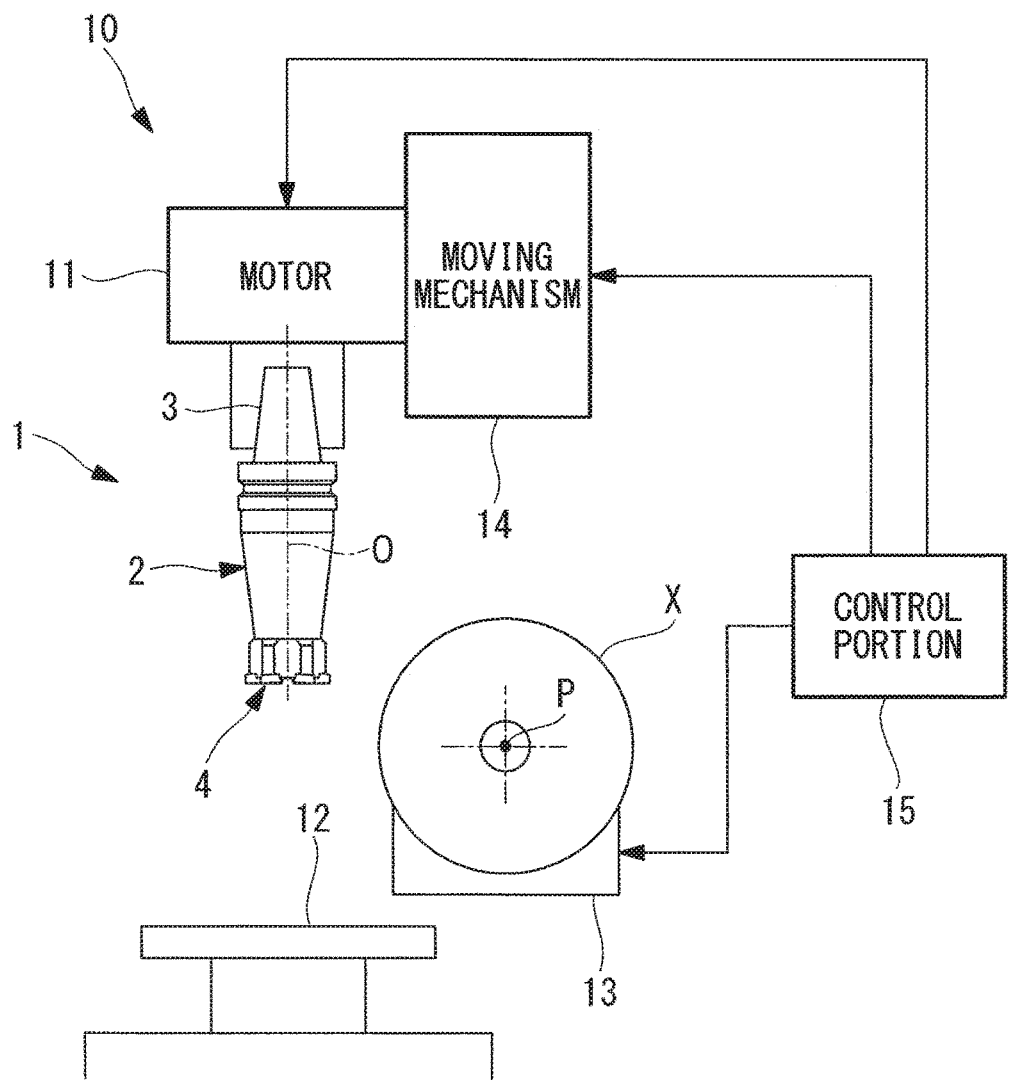
FIG. 4 is a schematic view showing a processing apparatus according to an embodiment of the present invention.

As shown in FIG. 4, the processing apparatus 10 according to this embodiment is provided with: a motor (rotational driving portion) 11 to which the milling/cutting tool 1 is attached by means of the taper shank 3 and that rotates the milling/cutting tool 1 about the center axis O; a table 12 that supports a processing subject X in an attached state; a main shaft (processing-subject rotating mechanism) 13 that rotates the processing subject X about a predetermined rotation axis (axis) P; a moving mechanism 14 that moves the milling/cutting tool 1 with respect to the table 12 and the main shaft 13; and a control portion 15 that controls the motor 11, the main shaft 13, and the moving mechanism 14.

The main shaft 13 is capable of rotating the processing subject X about the rotation axis P that is disposed in a plane that does not intersect the center axis O of the milling/cutting tool 1 and that is orthogonal to the center axis O, in other words, in a skew positional relationship with the center axis O of the milling/cutting tool 1.

The control portion 15 controls the rotational speed of the motor 11 and the main shaft 13, and controls the positioning that the moving mechanism 14 performs for the milling/cutting tool 1.

The operations of the thus-configured milling/cutting tool 1 and processing apparatus 10 according to this embodiment will be described below.

Figure 5:
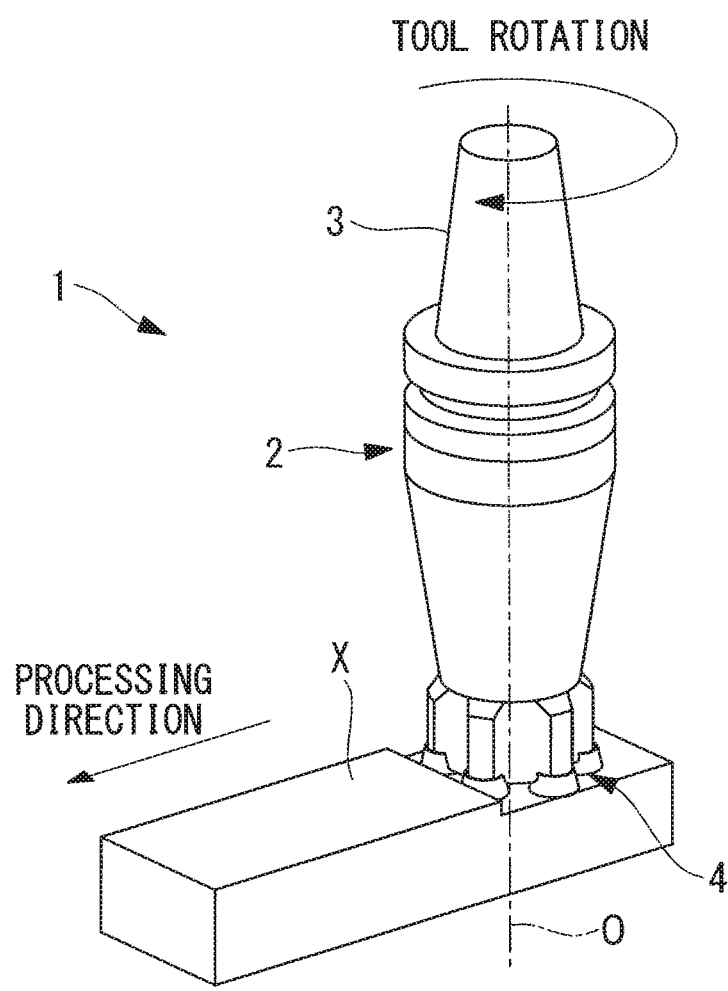
FIG. 5 is a perspective view for explaining milling performed by using the milling/cutting tool in FIG. 1.

In order to perform milling of the processing subject X by using the milling/cutting tool 1 and the processing apparatus 10 according to this embodiment, as shown in FIG. 5, the processing subject X is secured to the table 12, the milling/cutting tool 1, which is connected to the motor 11 by means of the taper shank 3, is rotated about the center axis O, and the circular tips 4 at the distal end of the milling/cutting tool 1 are moved close to the processing subject X by actuating the moving mechanism 14.

By doing so, milling of the processing subject X is performed by means of the plurality of circular tips 4 that are rotated about the center axis O of the tool main unit 2.

Figure 6:
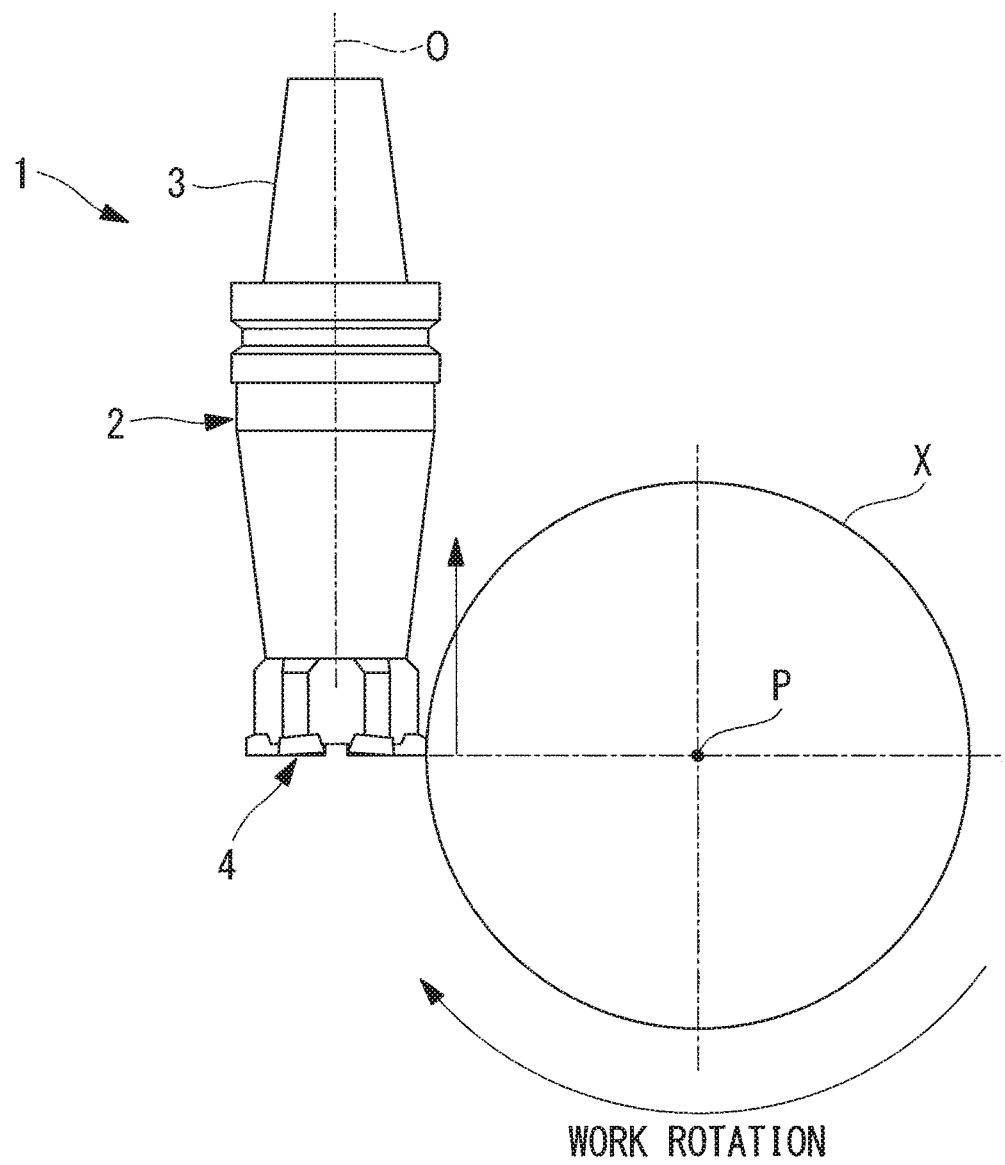
FIG. 6 is a side view for explaining turning performed by using the milling/cutting tool in FIG. 1.

In addition, in order to perform turning of the processing subject X by using the milling/cutting tool 1 and the processing apparatus 10 according to this embodiment, as shown in FIG. 6, the processing subject X is secured to the main shaft 13, the milling/cutting tool 1 that is connected to the motor 11 by means of the taper shank 3 is stopped in a predetermined phase about the rotation axis P, and, while rotating the processing subject X about the rotation axis P by actuating the main shaft 13, one of the circular tips 4 at the distal end of the milling/cutting tool 1 are moved close to the processing subject X by actuating the moving mechanism 14.

Because the center axis O of the milling/cutting tool 1 and the rotation axis P of the main shaft 13 are disposed in a skew positional relationship, as shown in FIG. 6, the tangential direction of the processing subject X at a position at which the processing subject X comes into contact with the circular tip 4 is aligned with a direction that is parallel to the center axis O of the milling/cutting tool 1. As a result, a force that the circular tip 4 receives from the processing subject X when performing turning acts in the direction that is parallel to the center axis O of the milling/cutting tool 1, as indicated by the arrow in FIG. 6, and thus, a moment that causes the milling/cutting tool 1 to be rotated about the center axis O is not generated.

As has been described above, with the milling/cutting tool 1 and the processing apparatus 10 according to this embodiment, it is possible to perform milling and turning by means of the single milling/cutting tool 1. In addition, because a moment that causes the milling/cutting tool 1 to be rotated about the center axis O is not generated when performing turning, there is an advantage in that it is not necessary to provide a special immobilizing apparatus that prevents the milling/cutting tool 1 from being rotated.

Note that, although the circular tips 4 are employed as the tips in this embodiment, there is no limitation thereto, and tips of other arbitrary forms may be employed. By employing the circular tips 4, there is an advantage in that it is possible to obtain good cut surfaces by decreasing the contact areas between the circular tips 4 and the processing subject X.

In addition, although the tool main unit 2 is formed in a columnar shape in this embodiment, there is no limitation thereto.

In addition, although this embodiment has been described in terms of an example in which six circular tips 4 are provided, there is no limitation thereto.

Figure 7:
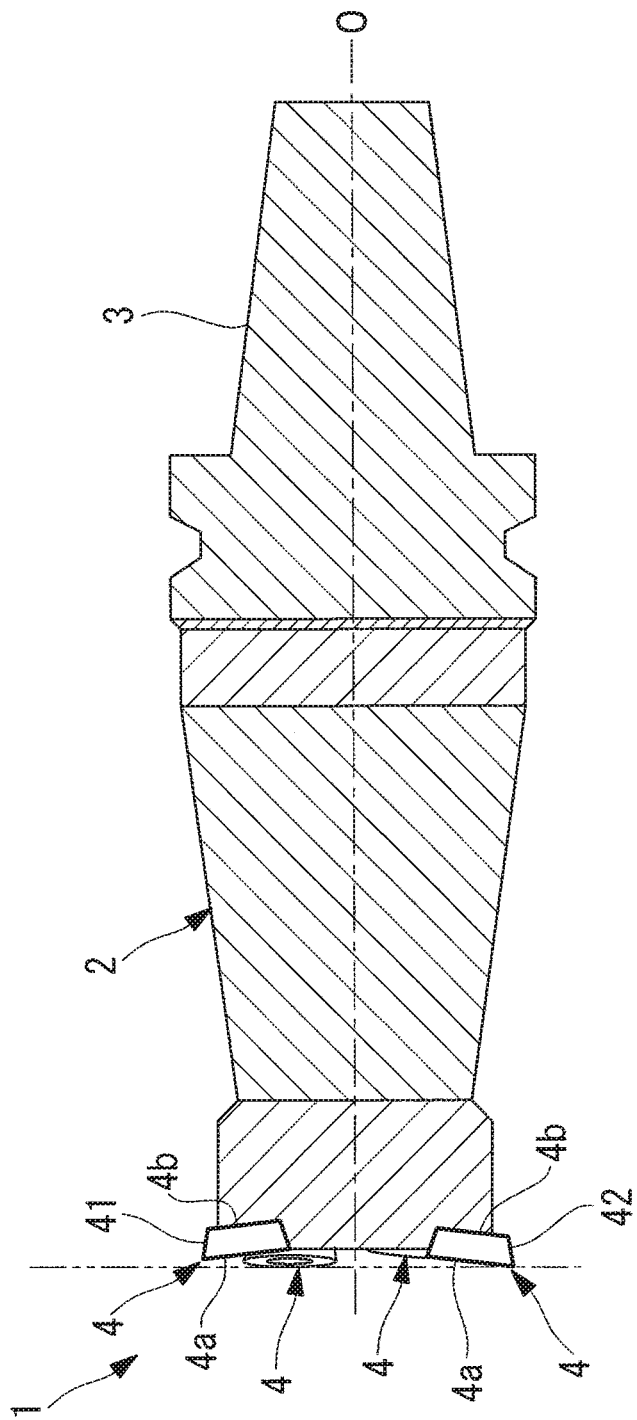
FIG. 7 is a longitudinal cross-sectional view showing a modification of the milling/cutting tool in FIG. 1.
Figure 8:
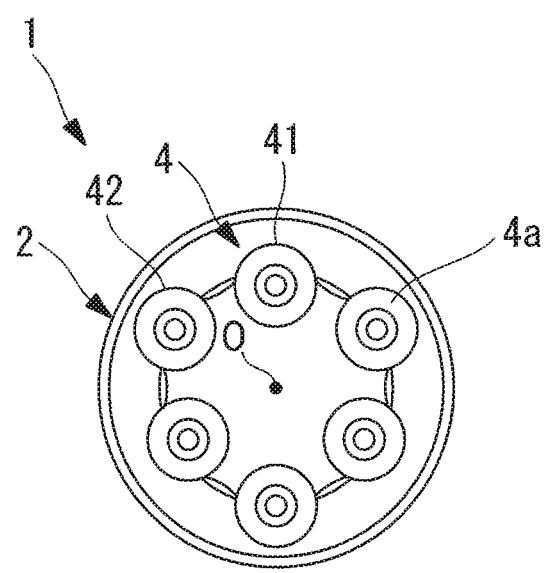
FIG. 8 is a front view showing the milling/cutting tool in FIG. 7.

In addition, although the six circular tips 4 are disposed at the same radial-direction positions and the axial-direction positions in this embodiment, alternatively, as shown in FIGS. 7 and 8, the arrangement thereof may be made different in the circumferential direction in an alternating manner. In FIG. 7, the two-dot chain line indicates positions of the large-diameter surfaces 4a in the axial direction on the most distal-end side.

In other words, as shown in FIGS. 7 and 8, the six circular tips 4 may be divided into groups each having three circular tips 4 disposed in an alternating manner, and the first tips 41 that belong to one of the groups may be disposed at positions that are retracted radially inward and axially rearward as compared to the second tips 42 that belong to the other group.

By employing such a configuration, it is possible to separate milling tips and turning tips. In other words, the second tips 42 that are disposed radially outward and axially forward with respect to the center axis O of the tool main unit 2 can be used as milling tips, and, when performing milling by means of the second tips 42, it is possible to perform milling without causing the first tips 41 to come into contact with the processing subject X.

On the other hand, when performing turning, one of the first tips 41 may be disposed in a phase in which the first tip 41 comes into contact with the processing subject X. By doing so, the second tips 42 are not used to perform turning.

By doing so, it is possible to separate the milling tips and the turning tips, and thus, there is an advantage in that it is possible to use different materials therein.

From the above-described embodiments and modifications thereof, the following aspects of the invention are derived.

An aspect of the present invention provides a milling/cutting tool including: a tool main unit that is rotated about an axis; and a plurality of tips that are disposed with spacings therebetween in a circumferential direction of the tool main unit about the axis, wherein the individual tips are disposed so that turning rake surfaces thereof face the axial direction.

With this aspect, it is possible to perform milling of a processing subject by means of the plurality of tips that are rotated about the axis by moving the tool main unit and the processing subject relative to each other while rotating the tool main unit about the axis. On the other hand, it is possible to perform turning of the processing subject by means of any one of the tips by moving the tool main unit and the processing subject relative to each other while rotating the processing subject with the tool main unit immobilized in a predetermined phase about the axis.

In this case, because the tip is disposed so that the turning rake surface thereof faces the axial direction, the direction of a force that tip receives from the processing subject when performing turning is aligned with a direction that is parallel to the axial direction, and thus, a moment that causes the tool main unit to be rotated about the axis is not generated. In other words, it is possible to perform turning and milling by means of a single milling/cutting tool without requiring a special immobilizing apparatus that holds the tool main unit so as not to be rotated about the axis when performing turning.

In the above-described aspect, the tips may be circular tips.

By doing so, it is possible to obtain a good cut surface by keeping the contact between the tips and the processing subject at a minimum.

In the above-described aspect, the tips may be formed of first tips and second tips that are disposed in the circumferential direction about the axis in an alternating manner, and the first tips may be disposed at positions that are retracted in radial directions and the axial directions with respect to the second tips.

By doing so, it is possible to perform milling by using the second tips that are protruded in the radial directions and the axial directions and to perform turning by using any one of the first tips. Because the first tips are not used when performing milling and the second tips are not used when performing turning, it is possible to separately employ settings that are appropriate for performing turning or milling.

Another aspect of the present invention provides a processing apparatus that is provided with any one of the above-described milling/cutting tools.

By doing so, it is possible to perform milling of the processing subject by means of the plurality of tips that are rotated about the axis by moving the tool main unit and the processing subject relative to each other while rotating the tool main unit about the axis. On the other hand, it is possible to perform turning of the processing subject by means of any one of the tips by moving the tool main unit and the processing subject relative to each other while rotating the processing subject with the tool main unit immobilized in the predetermined phase about the axis.

The above-described aspect may be provided with: a rotational driving portion that rotates the milling/cutting tool about the axis; a moving mechanism that can move the milling/cutting tool and the processing subject relative to each other; and a processing-subject rotating mechanism that rotates the processing subject about an axis disposed at a skew position with respect to the axis of the milling/cutting tool.

By doing so, it is possible to perform milling of the processing subject by means of the plurality of tips that are rotated about the axis by moving the tool main unit and the processing subject relative to each other by actuating the moving mechanism while rotating the tool main unit about the axis by actuating the rotational driving portion. On the other hand, it is possible to perform turning of the processing subject by means of any one of the tips by moving the tool main unit and the processing subject relative to each other by actuating the moving mechanism while rotating the processing subject by actuating the processing-subject rotating mechanism with the tool main unit immobilized in the predetermined phase about the axis by stopping the rotational driving portion.

The present invention affords an advantage in that it is possible to perform turning and milling by means of a single milling/cutting tool without requiring a special immobilizing apparatus that prevents a tool main unit from being rotated about an axis thereof.

REFERENCE SIGNS LIST 1 milling/cutting tool
2 tool main unit
3 taper shank
4 circular tip (tip)
4a large-diameter surface (rake surface)
4b small-diameter surface
10 processing apparatus
11 motor (rotational driving portion)
12 table
13 main shaft (processing-subject rotating mechanism)
14 moving mechanism
15 control portion
41 first tip
42 second tip
O center axis (axis)
P rotation axis (axis)
X processing subject

The invention claimed is:

1. A milling/cutting tool comprising:
a tool main unit that is rotated about an axis;
a plurality of tips that are disposed with spacings therebetween in a circumferential direction about the axis of the tool main unit;
wherein all of the plurality of tips are disposed so that turning rake surfaces thereof face an axial direction;
wherein the milling/cutting tool is configured to perform turning and milling; and
wherein all of the plurality of tips are circular tips, the plurality of circular tips being disposed at a distal-end surface of the tool main unit, and wherein each circular tip of the plurality of circular tips has a truncated-conical shape having a large-diameter surface on a distal-end side and a small-diameter surface on a proximal-end side, the large-diameter surface of each of the circular tips disposed facing a center axis of the tool main unit.

2. The milling/cutting tool according to claim 1, wherein:
the plurality of tips comprise at least two first tips and at least two second tips that are disposed in the circumferential direction about the axis in an alternating manner; and
the first tips are disposed at positions that are retracted in radial directions and the axial directions with respect to the second tips.

3. A processing apparatus comprising:
a milling/cutting tool comprising:
    a tool main unit that is rotated about an axis;
    a plurality of tips that are disposed with spacings therebetween in a circumferential direction about the axis of the tool main unit;
    wherein all of the plurality of tips are disposed so that turning rake surfaces thereof face an axial direction; and
    wherein the milling/cutting tool is configured to perform turning and milling;
    wherein all of the plurality of tips are circular tips, the plurality of circular tips being disposed at a distal-end surface of the tool main unit, and wherein each circular tip of the plurality of circular tips has a truncated-conical shape having a large-diameter surface on a distal-end side and a small-diameter surface on a proximal-end side, the large-diameter surface of each of the circular tips disposed facing a center axis of the tool main unit.

4. The processing apparatus according to claim 3, comprising:
a motor that rotates the milling/cutting tool about the axis;
a main shaft that rotates a processing subject to be processed about an axis disposed at a skew position with respect to the axis of the milling/cutting tool; and
wherein the milling/cutting tool and the processing subject are moved relative to each other.

5. The milling/cutting tool according to claim 2, wherein:
the large-diameter surface of each circular tip of the plurality of circular tips constitutes a rake surface for performing turning, and an outer circumferential surface of each of the circular tips constitutes a rake surface for performing milling.

* * * * *